Patented June 23, 1925.

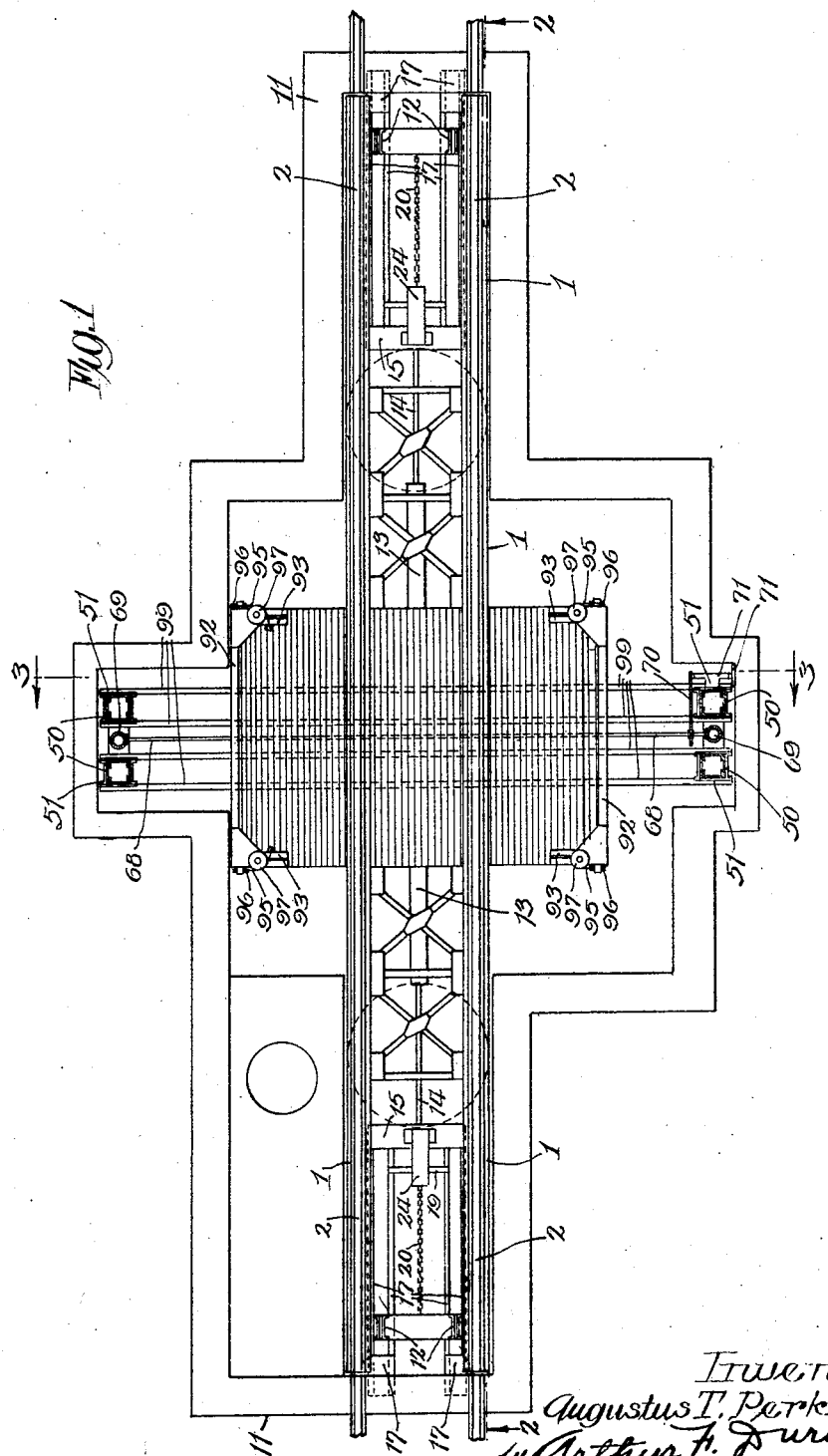

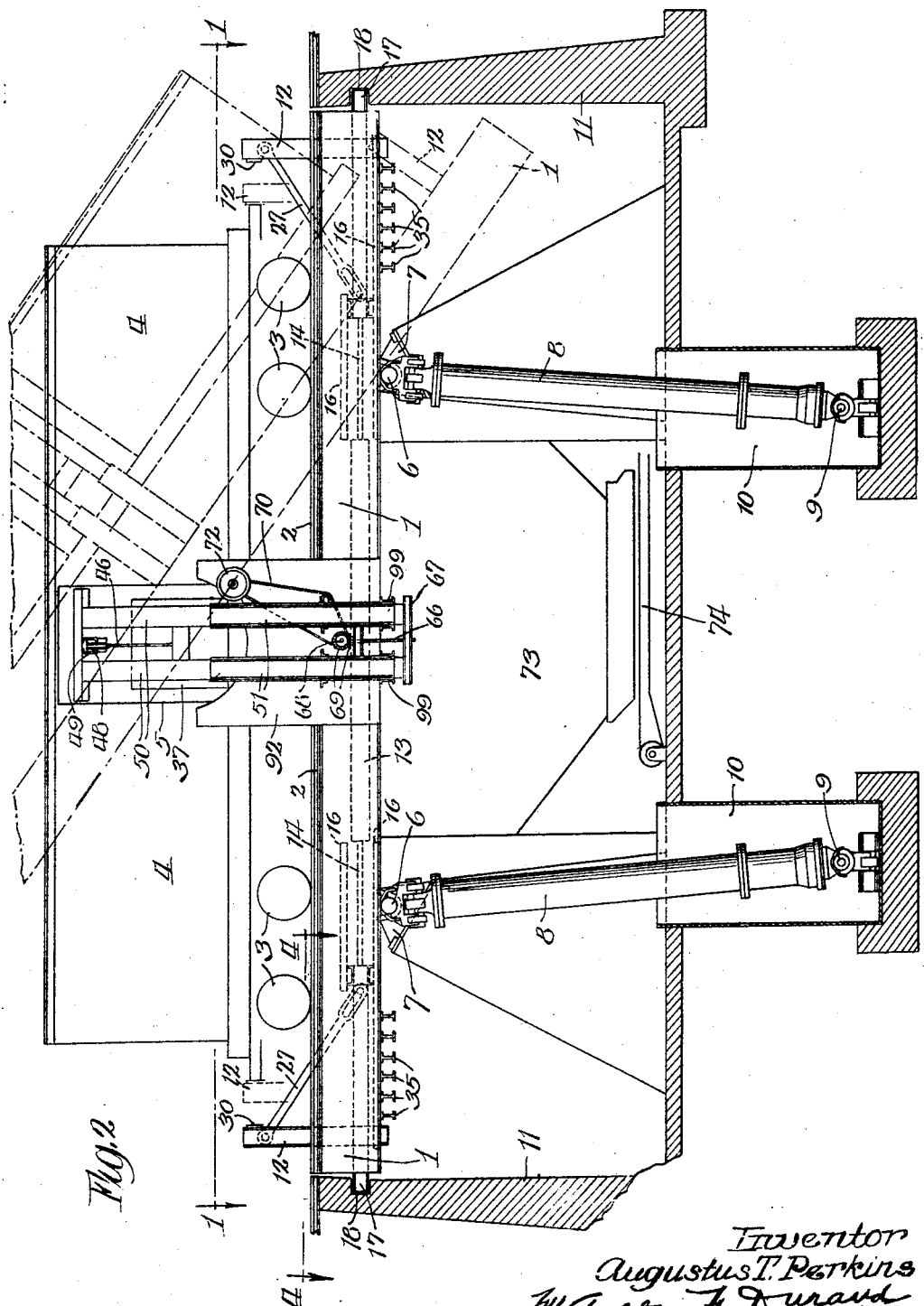

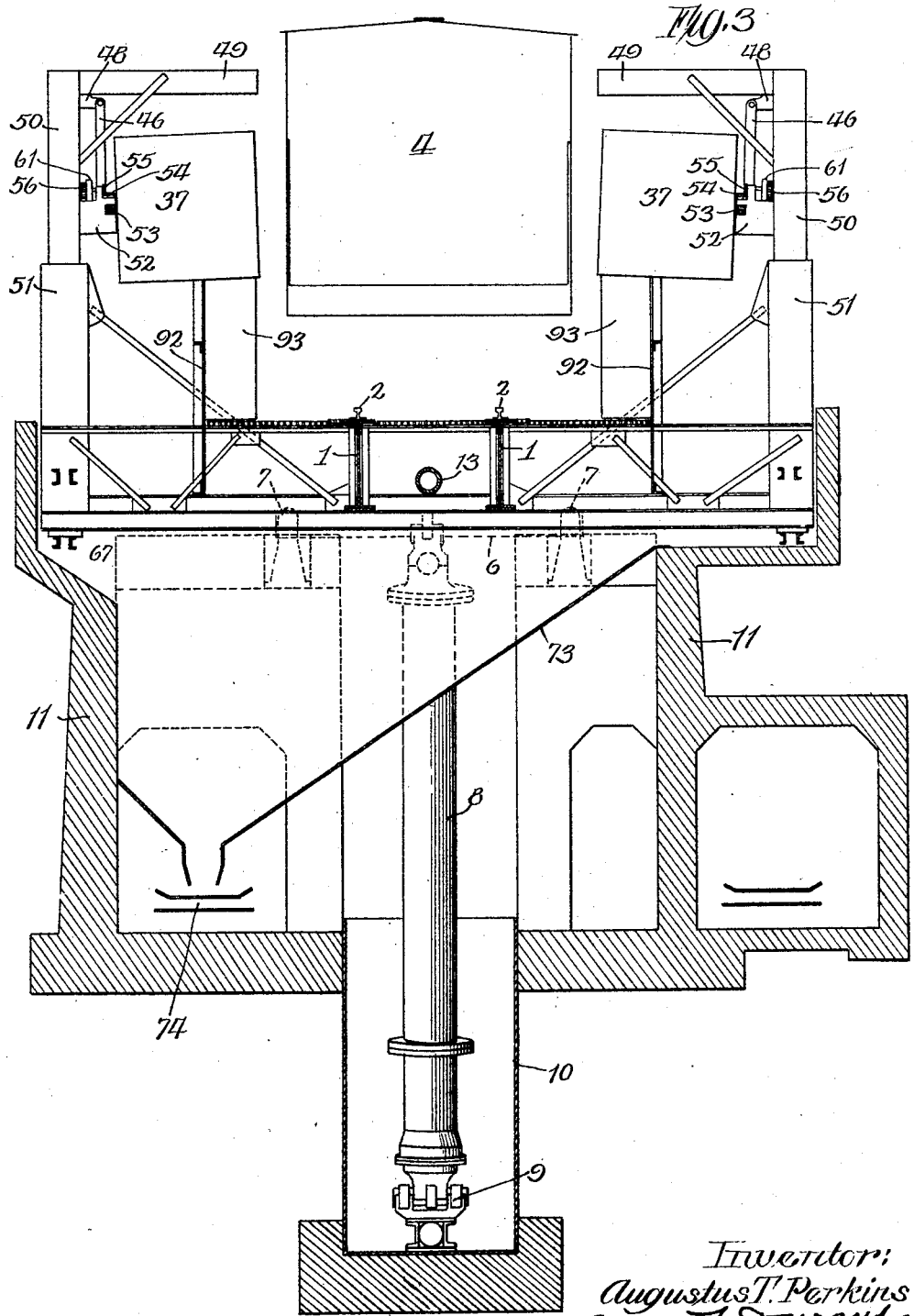

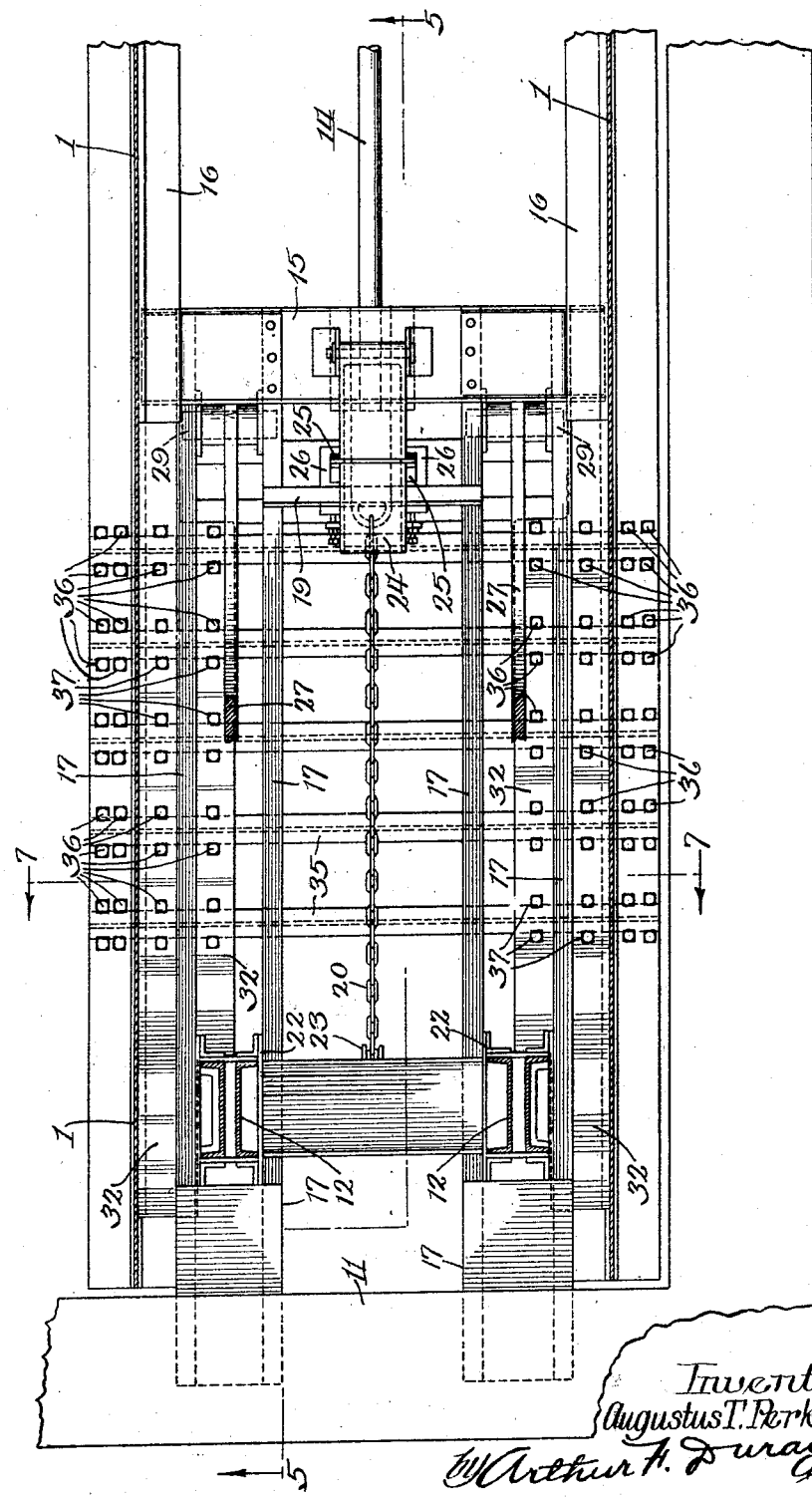

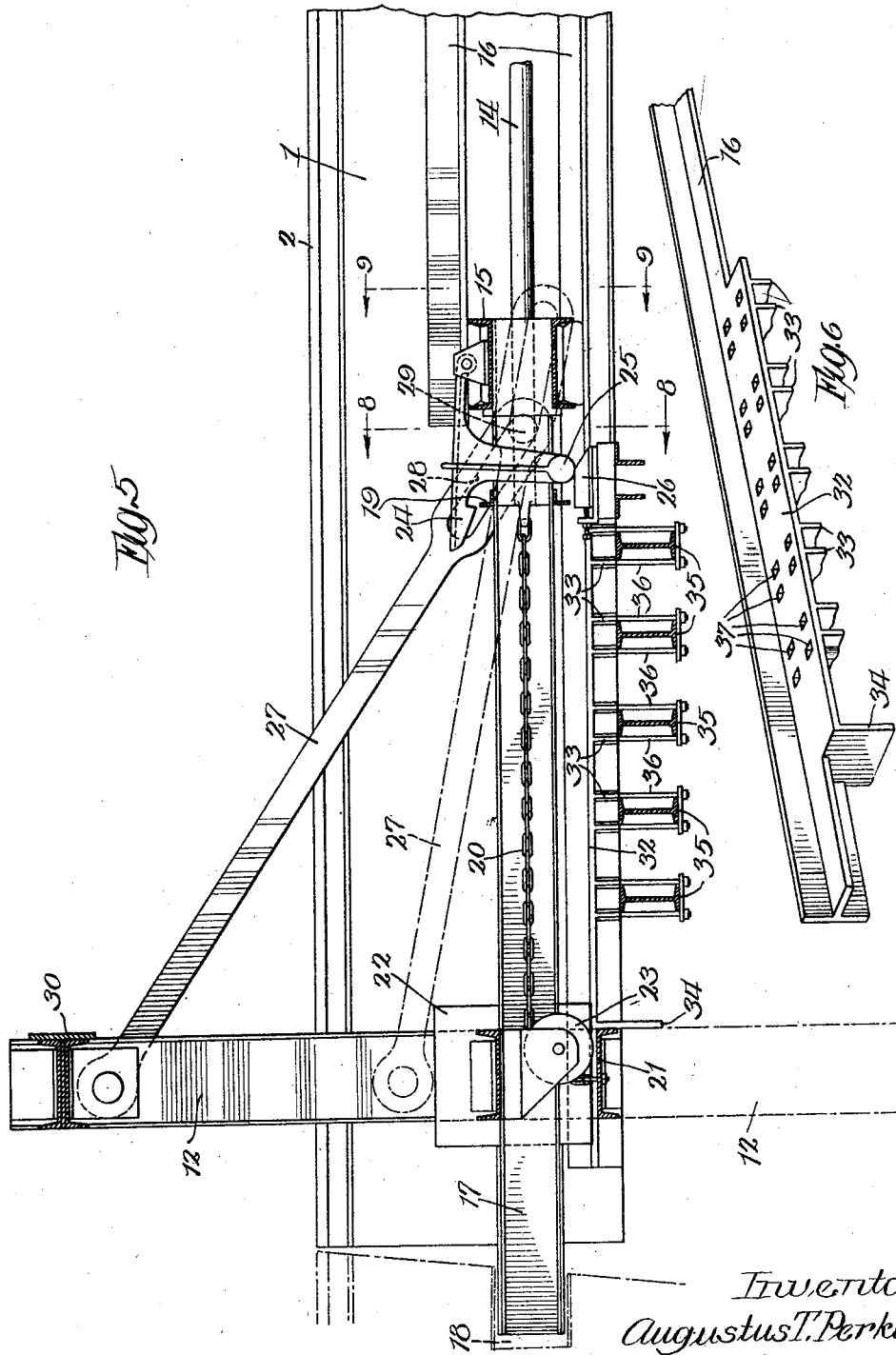

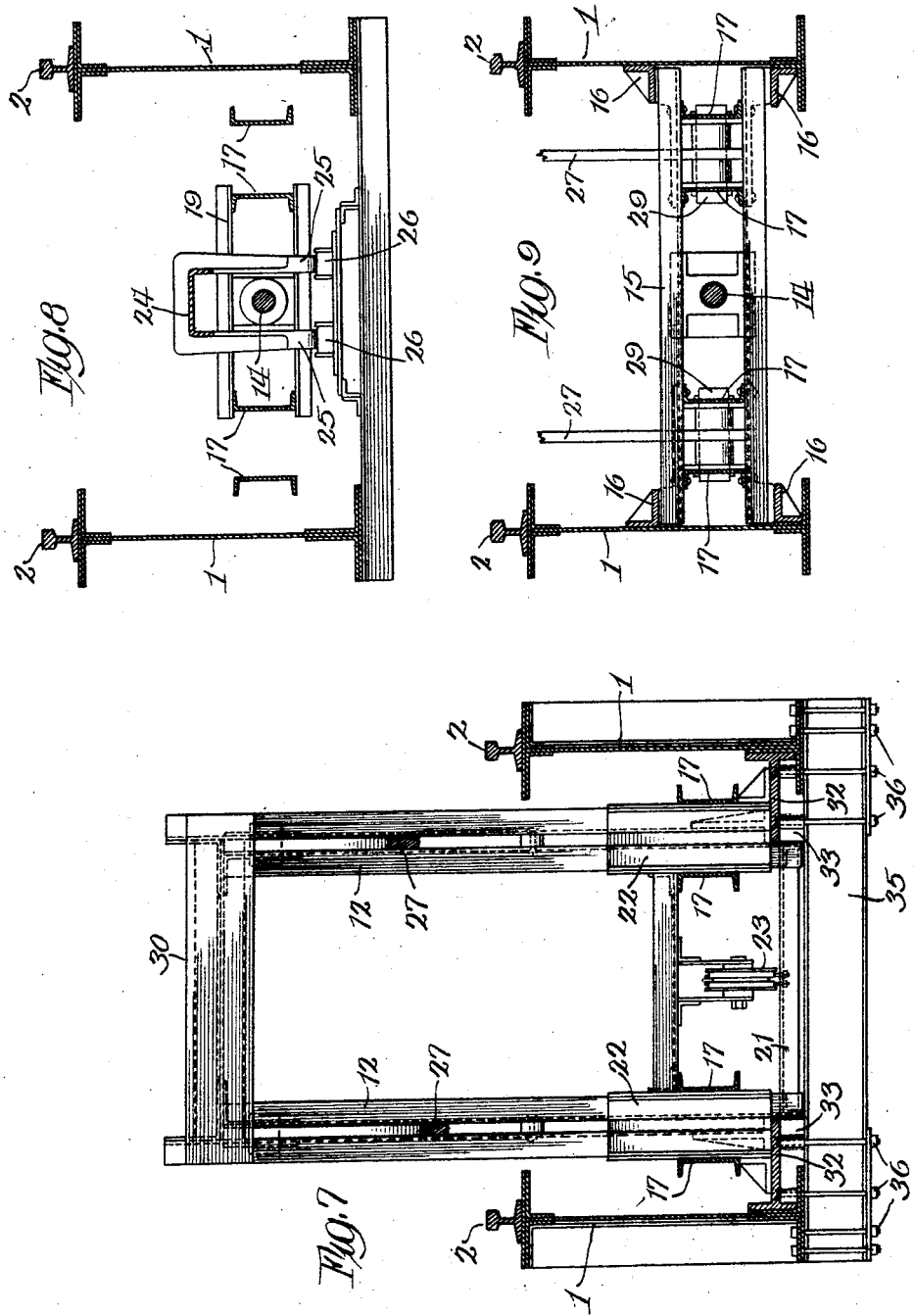

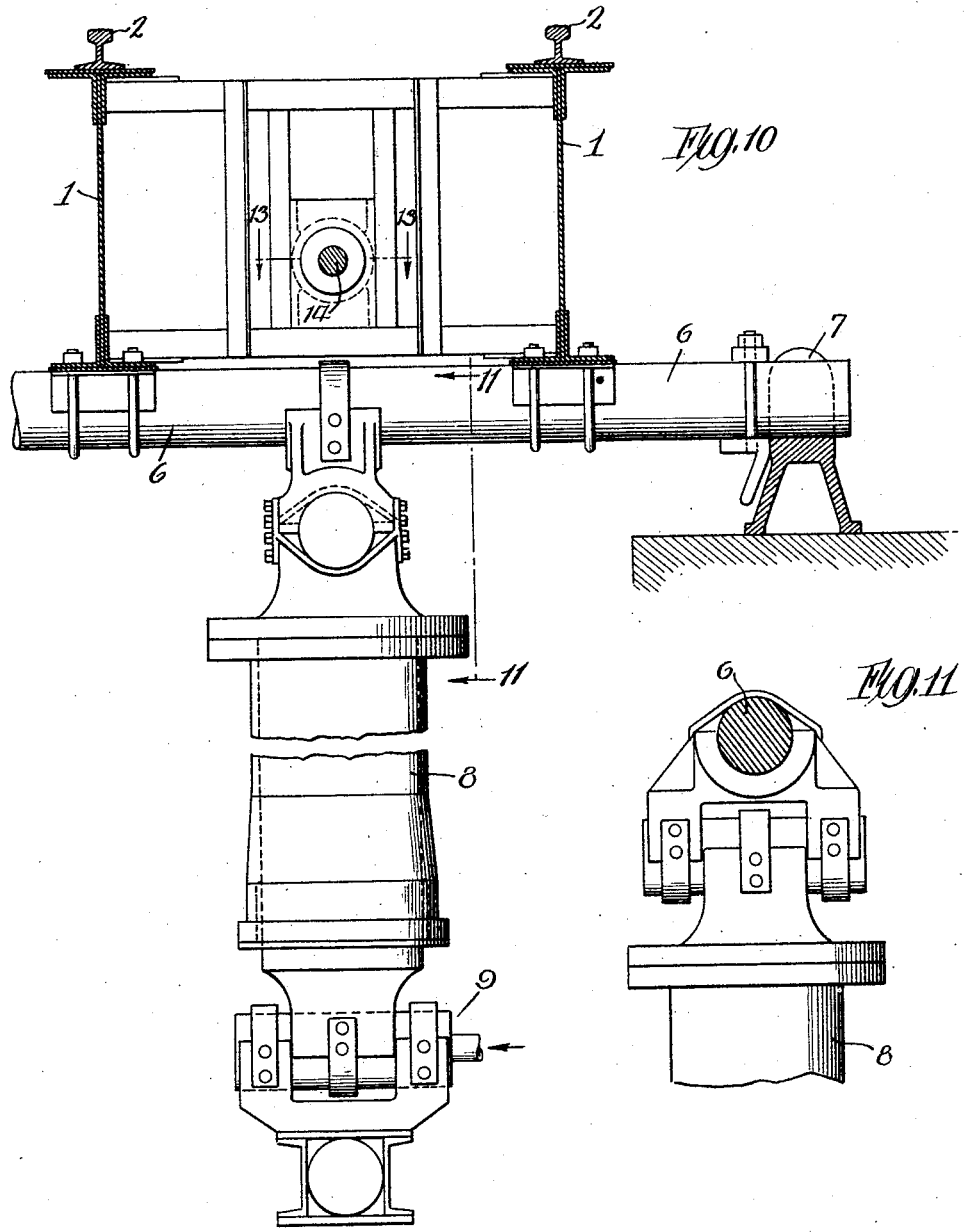

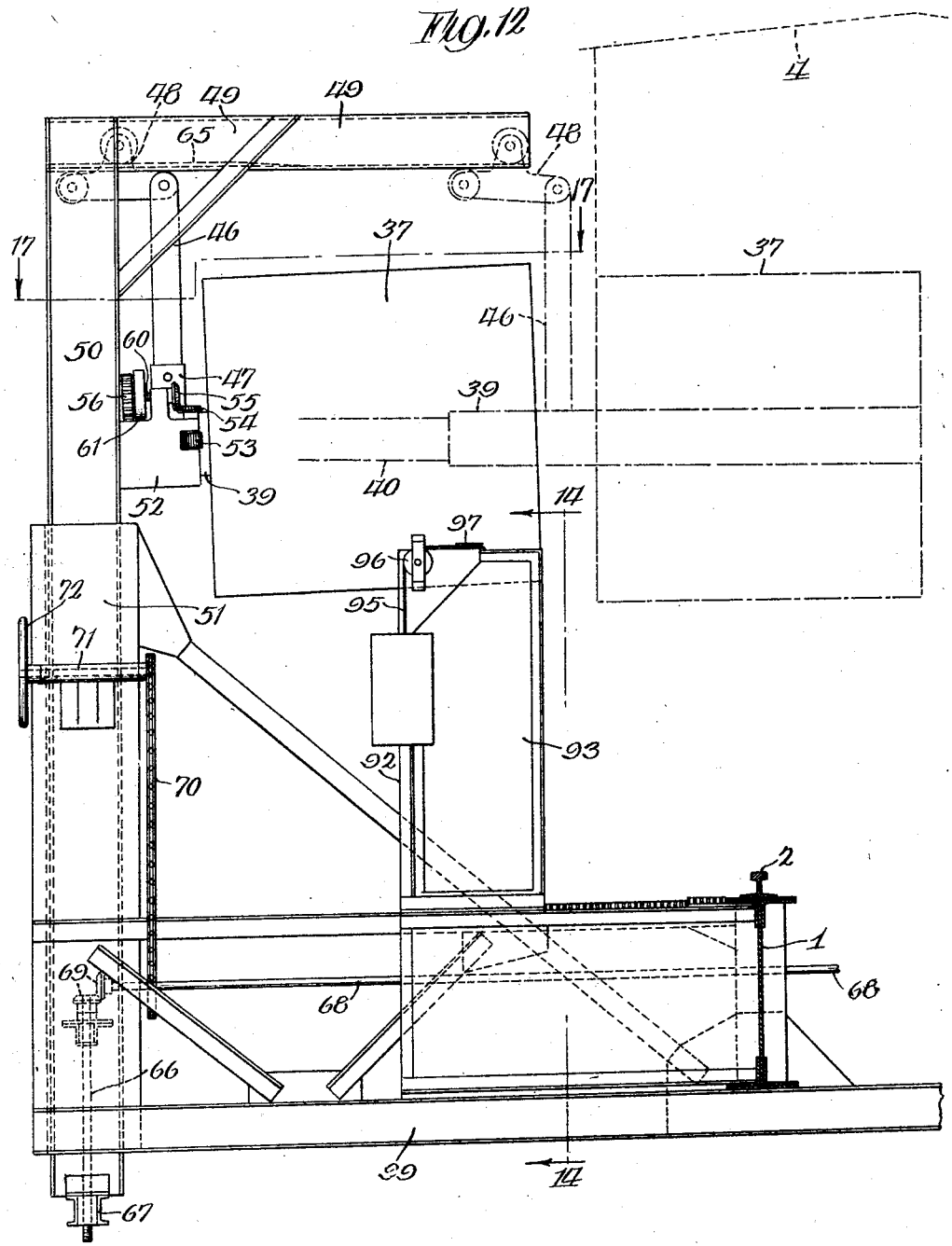

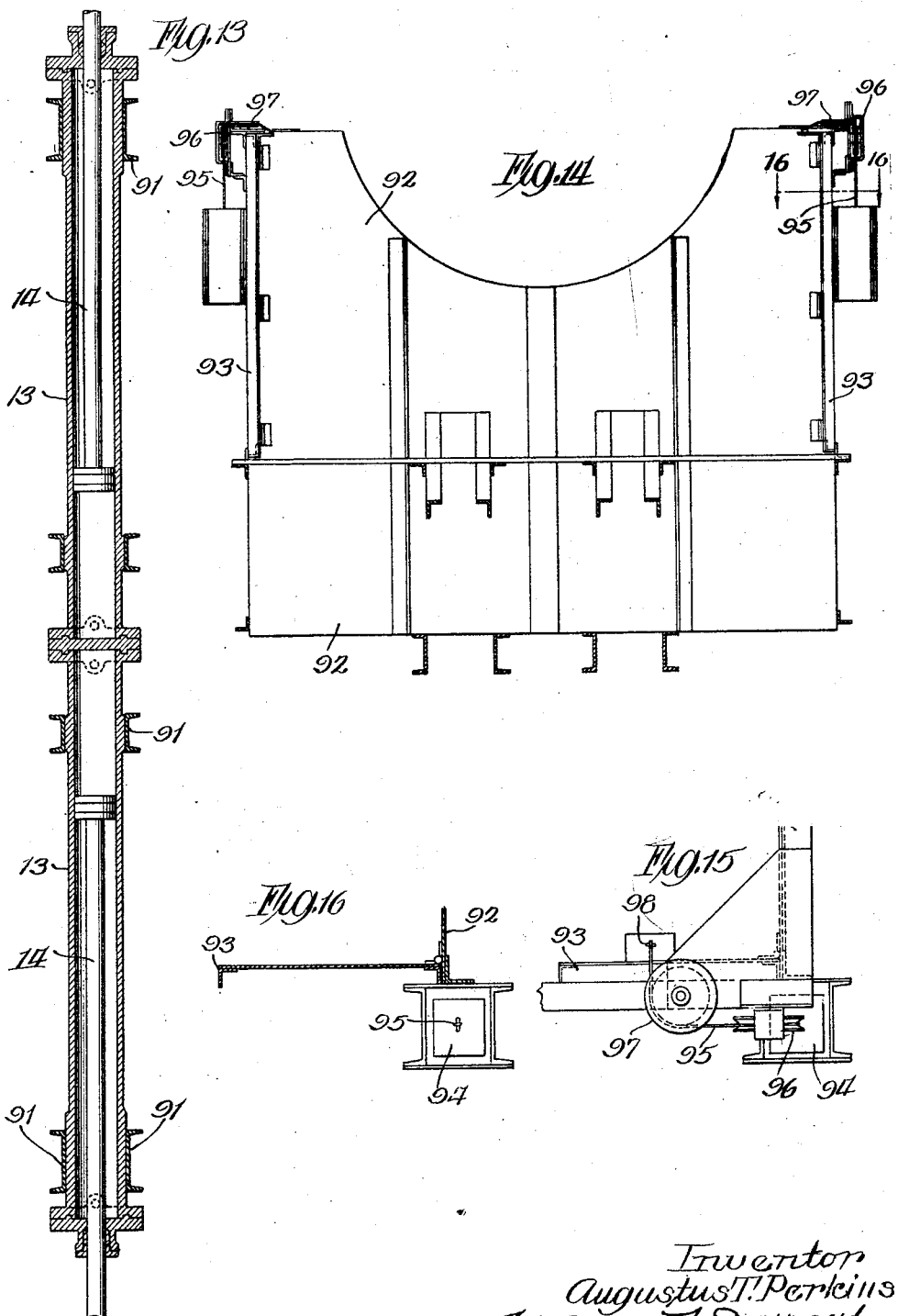

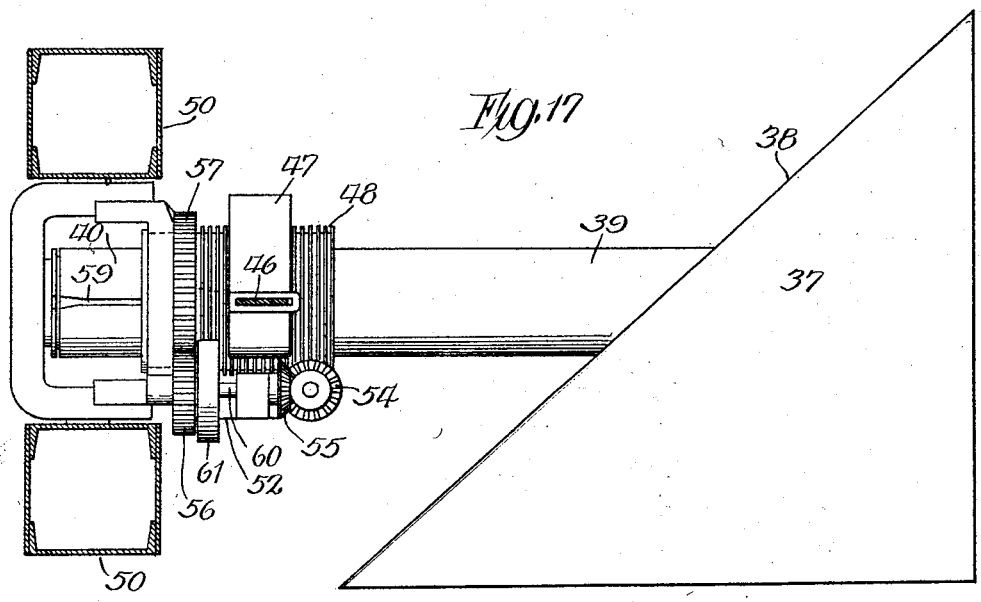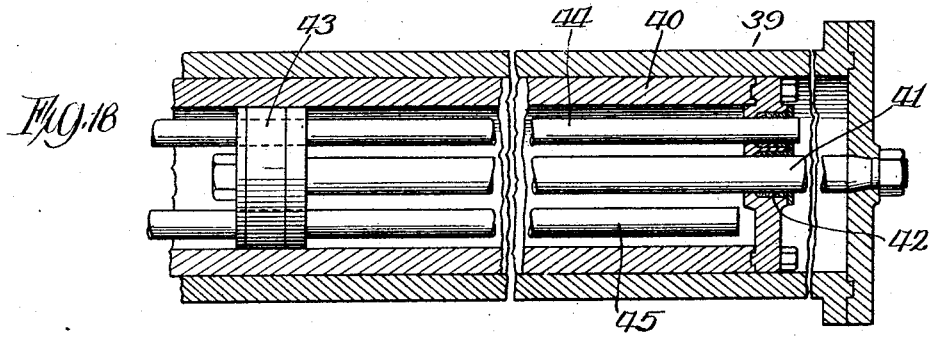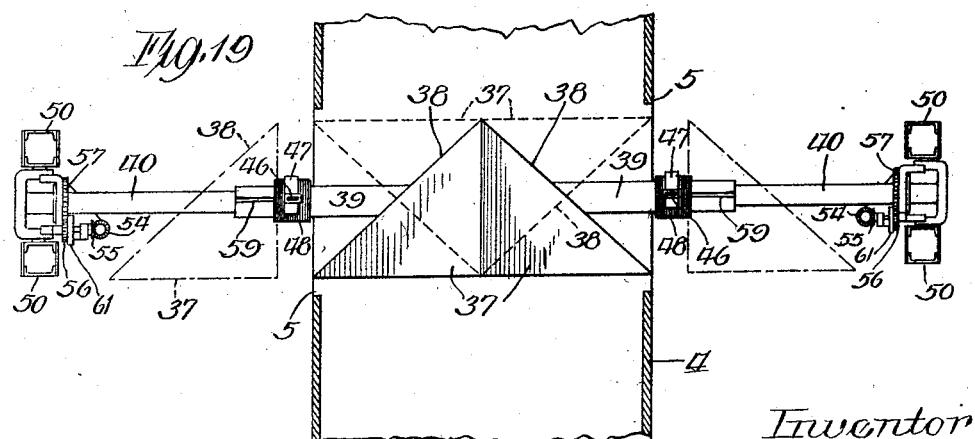

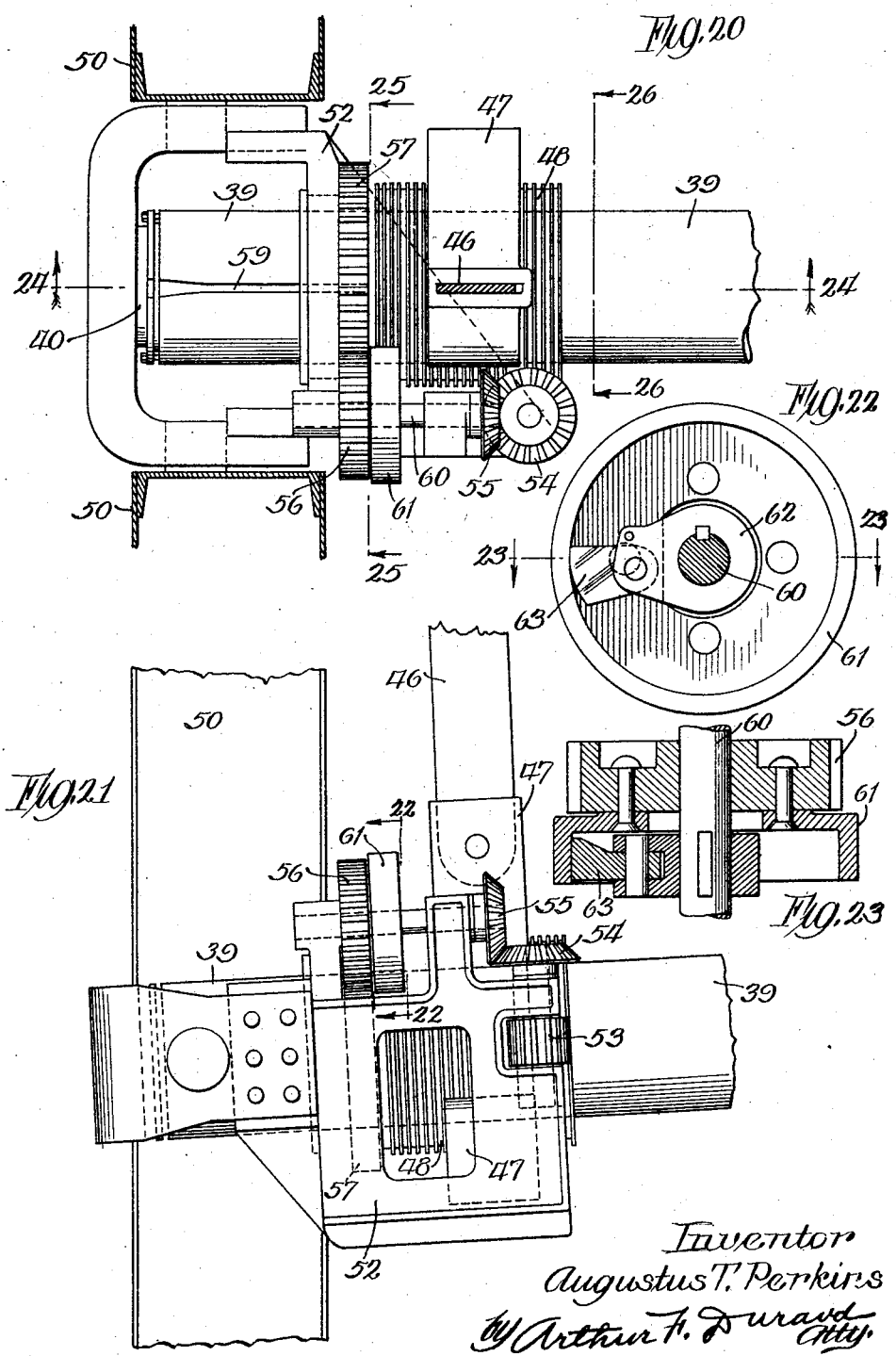

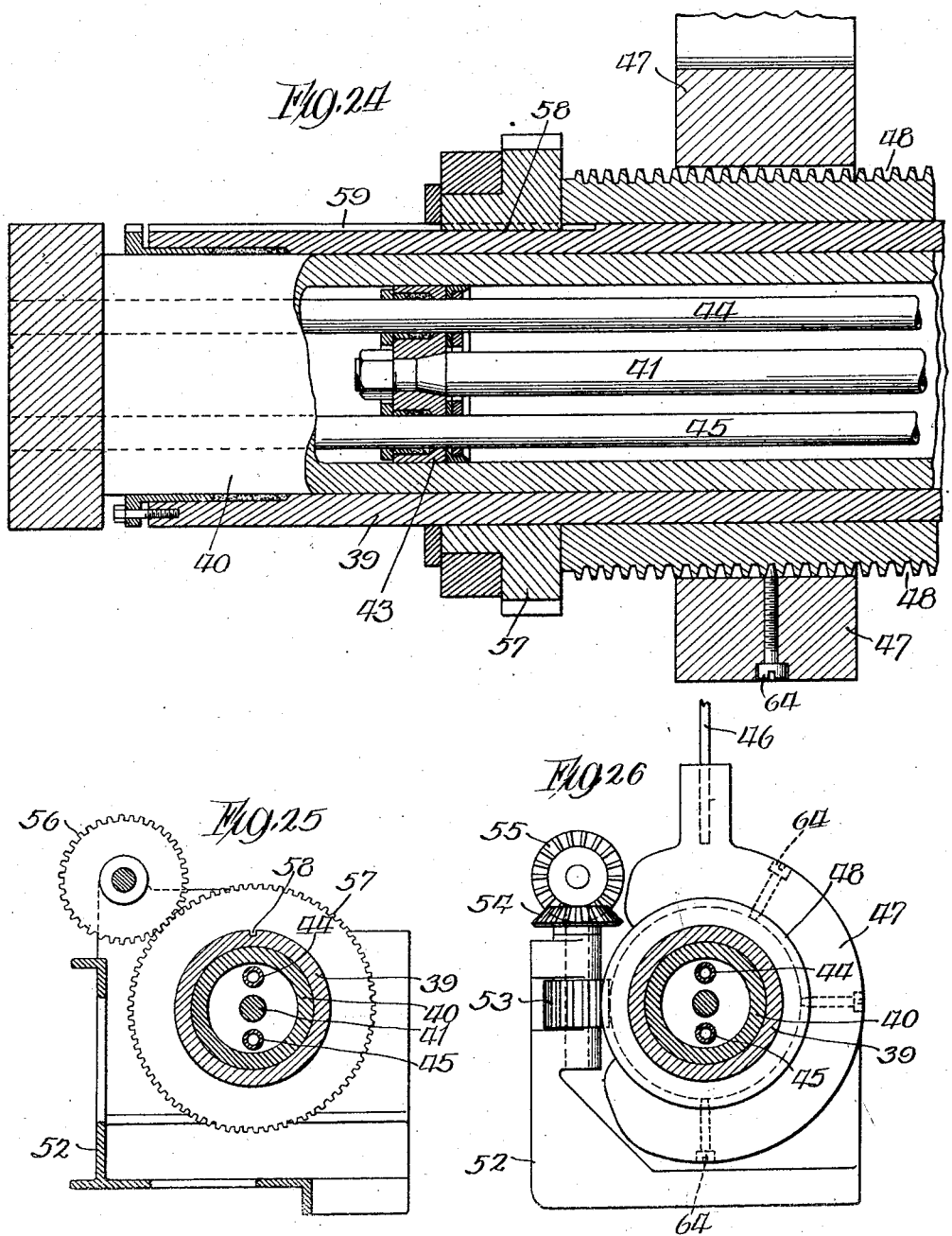

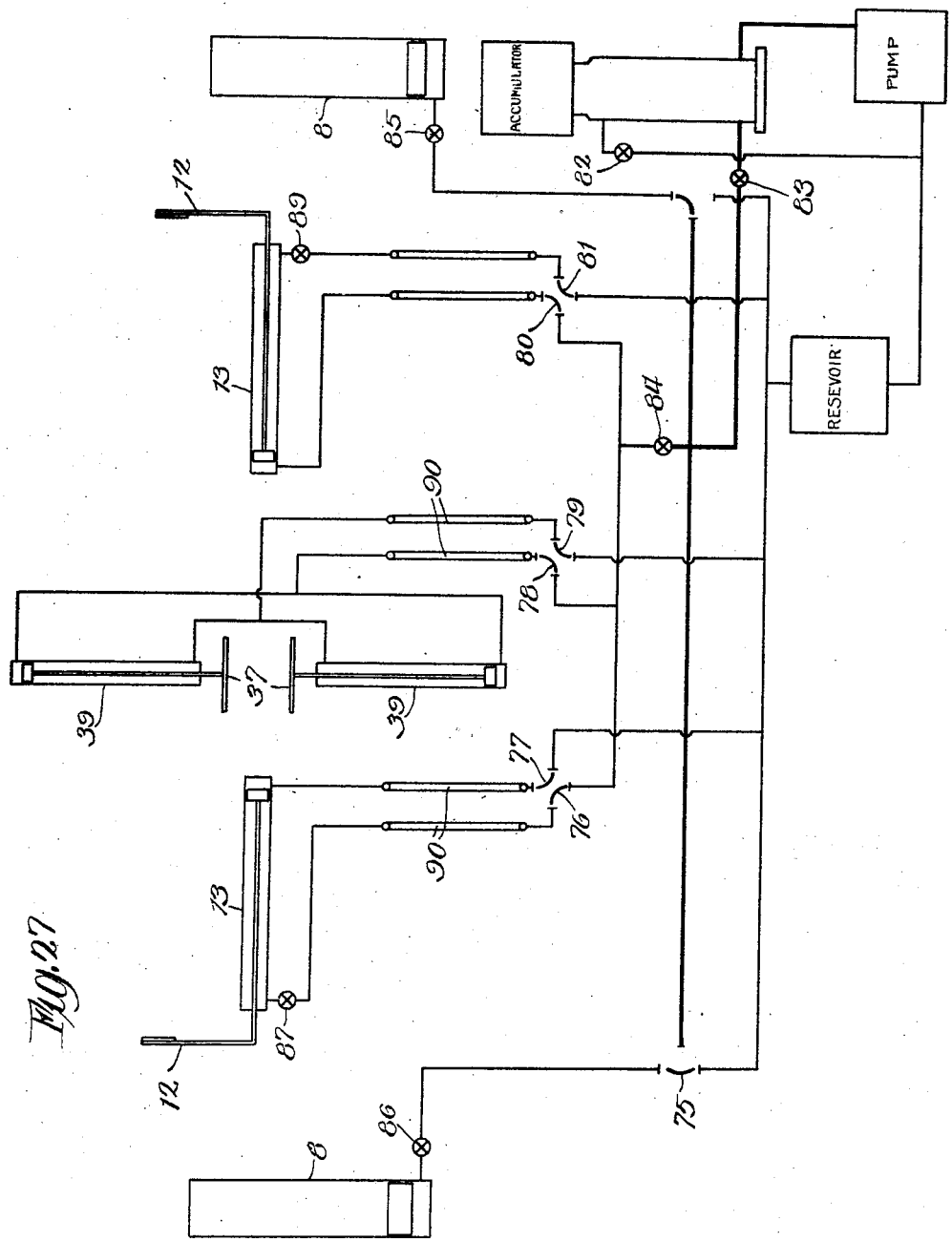

1,542,951

UNITED STATES PATENT OFFICE.

AUGUSTUS T. PERKINS, OF OAK PARK, ILLINOIS, ASSIGNOR TO WEBSTER MFG. COMPANY, OF CHICAGO, ILLINOIS, A CORPORATION OF OHIO.

CAR-DUMPING APPARATUS.

Application filed January 18, 1924. Serial No. 686,966.

*To all whom it may concern:*

Be it known that I, AUGUSTUS T. PERKINS, a citizen of the United States, and resident of Oak Park, Cook County, Illinois, have invented a certain new and useful Improvement in Car-Dumping Apparatus, of which the following is a specification.

This invention relates to an apparatus for dumping cars, and more particularly to apparatus for dumping grain cars, whereby the grain is discharged from the side doors of the car, in a rapid and satisfactory manner, by tilting the car, such as a box car, first in one position and then in another, thereby to discharge the grain or other materials therefrom.

Generally stated, therefore, the object of the invention is to provide a novel and improved construction and arrangement whereby a car filled with grain, or with other materials, may be unloaded quickly and in a satisfactory manner, without injuring the cargo or the car itself, as will hereinafter more fully appear.

It is also an object to provide certain details and features of construction and combinations tending to increase the general efficiency and the desirability of a car dumping apparatus of this particular character.

To these and other useful ends the invention consists in matters hereinafter set forth and claimed and shown in the accompanying drawings, in which—

Figure 1 is a plan of a car dumping apparatus embodying the principles of the invention;

Fig. 2 is a side elevation of said apparatus showing certain details of the structure in vertical section, and showing the apparatus with a car thereon tilted, in dotted lines, into one of the dumping positions thereof;

Fig. 3 is an enlarged transverse section on line 3—3 in Fig. 1;

Fig. 4 is an enlarged horizontal section on line 4—4 in Fig. 2;

Fig. 5 is a vertical section on line 5—5 in Fig. 4;

Fig. 6 is a detail perspective view of a portion of the construction;

Fig. 7 is a vertical section on line 7—7 in Fig. 4;

Fig. 8 is a detail vertical section on line 8—8 in Fig. 5;

Fig. 9 is a similar section on line 9—9 in Fig. 5;

Fig. 10 is an enlarged detail section showing certain elements in elevation, and showing the middle portion of the hydraulic lift broken away for convenience of illustration;

Fig. 11 is a detail section on line 11—11 in Fig. 10;

Fig. 12 is a fragmentary transverse section, showing certain portions in elevation;

Fig. 13 is a detail section on line 13—13 in Fig. 10;

Fig. 14 is a detail section on line 14—14 in Fig. 12;

Fig. 15 is a plan view of a portion of the apparatus shown in Fig. 14;

Fig. 16 is an enlarged detail section on line 16—16 in Fig. 14;

Fig. 17 is an enlarged detail section on line 17—17 in Fig. 12;

Fig. 18 is a longitudinal section of a portion of the cylinder and plunger construction as shown in Fig. 17;

Fig. 19 is a more or less diagrammatic plan view of the two rams which are used to batter down the doors of the loaded car, and which thereafter serve as deflectors to facilitate the discharge of the load from the car;

Fig. 20 is an enlarged detail plan view of the portion of the construction shown at the left in Fig. 17;

Fig. 21 is a side elevation of the mechanism shown in Fig. 20;

Fig. 22 is an enlarged vertical section on line 22—22 in Fig. 21;

Fig. 23 is a horizontal section on line 23—23 in Fig. 22;

Fig. 24 is an enlarged detail section on line 24—24 in Fig. 20;

Fig. 25 is a detail section on line 25—25 in Fig. 20;

Fig. 26 is a section on line 26—26 in Fig. 20;

Fig. 27 is a diagram of the entire apparatus.

As thus illustrated, the invention comprises a car platform 1 having rails 2 thereon to support the wheels 3 of the car 4, which latter may be an ordinary box car, such as those employed for shipping grain and other materials, having centrally located doors 5 at opposite sides thereof. The under side of said platform is preferably provided with transverse trunnions 6, these trunnions being arranged to rest in the stationary bearings 7 when the platform is level or horizontal. A hydraulic lift 8, of any suitable or desired character, is connected at its upper end to each trunnion 6, and has its lower end provided with a suitable pivotal bearing 9 located in the wells 10 formed in the bottom of the pit 11 in which the platform is located. Said platform may be of any suitable or desired construction, but is preferably equipped with clamps 12 which extend vertically at the ends of the platform, in position to bear against the ends of the car, whereby the latter is clamped in position on the platform. The platform is also equipped with hydraulic cylinders 13 having pistons therein, and the rods 14 of these pistons are arranged to extend through sliding crossheads 15, which latter slide on the guides 16 on the frame of the platform. Longitudinal locking beams 17 are rigidly connected to the crossheads 15 and are arranged to extend into cavities 18 formed in the abutments at the opposite ends of the tilting platform, whereby the latter is locked against tilting motion while the car is entering and leaving the platform. Crossheads 19 are adapted to slide back and forth on the beams 17, and are rigidly secured to the ends of the piston rods 14, these heads 19 having chains 20 that connect them with the lower cross beams 21 of the vertically movable clamps 12, which latter are preferably in the nature of rectangular frames which are movable up and down in suitable guides 22 carried by the beams 17. Sheaves 23 are suitably mounted on the guides 22 to support the chains 20, whereby movement of the piston rods 14 toward the ends of the platform will lower the clamps 12, while movement of the piston rods in the opposite direction, or toward each other, will pull the clamps 12 upward into their raised positions, and toward each other. Thus these clamps are lowered and depressed below the tops of the rails 2 in order to allow the car to enter and leave the platform. The crossheads 15 are provided with pivoted latches 24 for engaging cam blocks 26 suitably mounted on the platform, whereby movement of the crossheads 19 toward the ends of the platform will be accompanied by a similar movement of the crossheads 15 until the arms 25 engage the beveled cam blocks 26, thus releasing the latches 24, and thereafter the movement of the rods 14 toward the ends of the platform serves merely to lower the clamps 12, the locking beams 17 having reached the limit of their motion into locking position at about the time that the arms 25 engage the blocks 26, in the manner shown in the drawings. The braces 27 are pivoted at their upper ends on the clamps 12, and have their lower end portions provided with slots 28 to receive the cross pins or pivots 29, suitably carried by the locking beam 17, whereby these braces do not interfere with the upward and downward movement of the clamps 12 in a manner that will be readily understood. These clamps 12 have bumpers 30 to engage the ends of the car, thus holding the car against endwise displacement during the operation of tilting the platform to discharge the load from the car. After the car is in position on the platform, the hydraulic pistons in the cylinders 13 are operated to move the rods 14 toward each other, and this automatically raises the clamps 12 into the positions which they occupy in Fig. 2 of the drawings, and when the crossheads 19 bump against the crossheads 15, the latter then move toward each other to automatically withdraw the locking beams 17 from the cavities 18 in the abutments between which the tilting platform is mounted, these abutments having rails 31 disposed in line with the rails 2 when the platform is horizontal. This final movement of the rods 15 causes the clamps to be moved toward the ends of the car and into the positions indicated in dotted lines in Fig. 2 of the drawings, the lower ends of the members 12 sliding on the plates 32 until the bumpers 30 engage the car. The said plates 32 are secured to the bottom of the platform, lengthwise thereof, with the transverse flanges 33 formed on the bottom of each plate, and with offsets 34 near the ends of these plates to bear against the sides of the clamps 12 when the latter are pulled upward into raised position. This platform is of a strong construction and the clamping means mounted thereon are strong and amply capable of holding the loaded car in position during the tilting of the platform. Transverse I-beams 35 are preferably applied to the lower edges of the flanges 33, and are held in place by bolts 36 having their heads sunk in the openings 37 with which the plates 32 are provided.

For the purpose of opening the cars, after they are rolled onto the platform, battering rams 37 are provided and carried by the platform, in position to detach the boards which are usually employed to close the doorways of the cars, before the cars are loaded. These battering rams 37 are preferably of the form and shape shown in Figs. 3, 12, 17 and 19, being each formed with a beveled surface or face 38 to serve as a deflector to deflect the grain or other materials outward through the doorways 5, as will hereinafter more fully appear. These battering rams 37 are mounted on horizontally disposed cylinders 39 which slide on the inner cylinders or hollow members 40, and the outer end of each cylinder 39 is provided with a piston rod 41 which extends back through the stuffing box 42 in the end of the cylinder 40, and is provided with a piston head 43 in this inner cylinder. Pipes 44 and 45 terminate respectively in the interiors of the cylinders 39 and 40, so that fluid pressure admitted through the pipe 44 will cause the cylinder 39 and its ram 37 to move toward the car, while fluid pressure admitted through pipe 45 will react against the piston head 43 and cause the ram 37 to move away from the car. When the rams move toward the car, the boards of the doorways are broken through, and the two rams move into the positions in which they are shown in Fig. 19, thus permitting quite a quantity of the load to be discharged while the car is still horizontal, leaving the end portions of the load remaining in the end portions of the car. When the two rams 37 come together as shown in Fig. 19, their two surfaces 38 form a wedge pointing toward one end of the car, and this end of the car is then raised by one of the hydraulic lifts 8, as indicated in dotted lines in Fig. 2 of the drawings. This tilting of the car causes the upper end porton of the load to gravitate downwardly against the surfaces 38, so that the latter deflect this end portion of the load outwardly through the doorway and into the pit in which and over which the apparatus is located. The platform is then returned to a level position, and the rams 37 are withdrawn and reinserted in reverse position, as indicated in dotted lines in Fig. 19, so that the point of the wedge formed by the two surfaces 38 will then point toward the other end of the car and toward the remaining end portion of the load. The other end of the car is then raised, by operating the other hydraulic lift 8, and this final portion of the load is then caused to gravitate downwardly against the surfaces 38, causing the final discharge of the load from the opposite sides of the car. The two rams are supported by links 46 which have their lower ends attached to the stirrups 47 that surround the cylindrical gears 48 with which the two cylinders 39 are provided. The upper ends of these links 46 are connected to trolleys 48 that travel on the horizontal and transversely arranged tracks 49, the latter being rigid with the vertically disposed beams 50 which are slidable up and down in the guides 51 on the sides of the platform, whereby the rams can be accurately adjusted up and down for cars of different heights. The outer ends of the cylinders 40 are supported by heads 52 on the vertically movable beams 50, and between these two beams, at each side of the platform. These heads 52 have pinions 53 for engaging the cylindrical gears 48, these pinions 53 being rigid with bevel gears 54 that in turn engage the bevel gears 55 which are also mounted in suitable bearings on the castings forming the structure of the heads 52 previously mentioned. It will be seen, referring to Figs. 20 and 21, as well as Figs. 25 and 26, that the shafts of the bevels 55 are provided with pinions 56 which engage the gears 57 that are mounted in the heads 52, to encircle the cylinder 39, as shown in Fig. 24, these ring gears 57 having splines 58 to engage the grooves 59 in the cylinders 39, when the latter are moved backward upon the inner tubes 40 previously mentioned. The pinions 56 are loose on the shafts 60, but are rigid with the clutch members 61, while the inner clutch member 62 is keyed to the shaft 60, at each side of the tilting car platform. The clutch members 62 are provided with pivoted engaging portions 63 that are operative to rotate the members 61 in one direction, but are inoperative to rotate these members 61 in the opposite direction; hence, when the rams are withdrawn from the car, after the middle portion and one end portion of the load has been discharged, the pinions 53 are actuated by the cylindrical gears 48, with the result that the clutch members 61 are rotated to rotate the pinions 56 and this results in a rotation of the ring gears 57, with a consequent rotation of the outer cylinders 39 upon which the battering rams are mounted. It is in this way that the two rams are turned over or gives a one half rotation, in order to present their deflecting surfaces 38 in the other direction. When the rams then move forward in the car again, in their reversed positions, the clutch elements 63 are inoperative to rotate the members 61, and consequently the cylinders 39 move outward and without any further rotation. During the rotation of the cylinders 39, in order to reverse the positions of the battering rams, the cylindrical gears 48 maintain engagement with the pinions 53, of course, as this is the purpose of making these gears 48 cylindrical in form. As cylinders 39 move outward, the splines 58 are disengaged from the grooves 59, but it will be seen that the grooves are widened at the ends of the cylinders 39, in order to easily find the splines when the rams are withdrawn from the car. The stirrups 47 are preferably provided with screws 64 which engage in the grooves of the cylindrical gears 48, thereby to prevent displacement of these gears from the stirrups. Each stirrup is open at one side, it will be seen, to expose one side of the gear 48 to the adjacent pinion 53, so that two pinions 53 may be actuated in the desired manner to turn the rams over when they are withdrawn from the car. The rams 37 again move forward in the car, at opposite sides thereof, close to or upon the floor of the car, and will then tilt with the car when the latter is tilted to discharge one end portion of the load. When the car is returned to horizontal position the rams return to substantially a level position, and the widened ends of the grooves 59 encounter the splines 58 at about the time the rams leave the car. In other words, when the rams are withdrawn from the car, the widened ends of the grooves 59 will find the splines 58 where the latter were left by the last rotary movement of the ring gears 57, and after the sequence of operations described, constituting a cycle, the parts are then in the positions as shown in Figs. 12, 17 and 19, so far as the battering ram apparatus is concerned. It will be seen, moreover, that owing to the slight elevations 65 for the outer portions of the tracks 49, upon which the trolleys 48 travel, the rams 37 will be tilted upward a little, when returned to their normal or resting positions. In this way, therefore, the rams are adapted to move toward each other in slightly raised positions, and to then settle down upon the floor of the car, or close thereto, in horizontal position, as shown in dotted lines in Fig. 12 of the drawings.

Any suitable or desired means can be employed for lowering and raising the tracks 49, thereby to raise and lower the battering rams. For example, vertically disposed screws 66 can be mounted on the tilting car platform, to extend through threaded portions 67 on the lower ends of the beams 50, whereby rotation of these screws will move the beams 50 up and down. For this purpose a transverse shaft 68 can be employed, having beveled gear connection 69 with the lower end of the screws 66, and this shaft 68 can be connected by a sprocket chain 70 with a hand wheel shaft 71 having a hand wheel 72 for the operation thereof, this shaft 71 being mounted in a bearing on one of the guides 51 in which the beamlike members 50 are arranged to slide up and down in a manner previously explained.

For the reception of the grain or other materials discharged from the car, a hopper 73 can be employed in the pit, and a belt conveyor 74 of any suitable character can be arranged to receive the discharge from said hopper, thereby to convey the grain or other materials to any desired place.

Thus it will be seen that the method employed involves the removal of the cheap board closures provided for the doors, at the opposite sides of the car, thereby discharging a portion of the load. The method then further involves the tilting of the car in one direction to discharge a part of the load from the doorways at the opposite sides of the car. Finally the method shown and described involves the tilting of the car in the opposite direction, endwise thereof, thereby to discharge the final end portion of the load. The battering rams are carried by the tilting platform, and the hydraulic instrumentalities for operating these battering rams are also carried by the tilting platform in the manner shown and described, as well as means for locking the platform in horizontal position during the time that the car is being placed in position thereon or taken therefrom.

The various hydraulic power devices, such as the jacks or lifts 8 and the cylinders and pistons 13 and the cylinders and pistons 39 and 43, may have any suitable means for supplying the fluid pressure thereto, and any suitable arrangement can be employed to control these instrumentalities to cause their operation in the manner explained. For example, the arrangement shown in Fig. 27 may be employed, the various hydraulic cylinders previously mentioned being connected with piping to the pump, accumulator and reservoir as shown. Valves 75, 76, 77, 78, 79, 80 and 81 can be interposed in the piping to control the fluid pressure in the desired manner. In addition to an automatic release valve 82, of any suitable character, an accumulator protective valve 83 can be located in the pipes leading to the accumulator as shown. A pressure reducing valve 84 may be located in one of the pipes, as shown, and valves 85 and 86 may be located in the pipes leading to the cylinders 8 as shown. In addition, valves 87 and 88 may be interposed in the pipes leading to the cylinders 13, in a suitable manner, thereby to insure such valve control as is necessary to insure the mode of operation as shown and described. It will be seen that the fluid pressure connections to the cylinders 13 and 39 include swing joints 90 of any suitable, known or approved character, inasmuch as these cylinders are mounted on the tilting platform, and everything carried by the platform tilts therewith, and consequently suitable provision must be made in the fluid pressure connections leading to the apparatus on the platform. As shown in Fig. 13, the two cylinders 13 can be arranged end to end, and can be supported by beams 91, or by any suitable means, it being understood that these cylinders are supported rigidly in position on the platform, and that fluid pressure admitted first at one end with either cylinder, then at the other, will reciprocate the piston therein in the desired manner.

It will be seen that the discharge of the grain or other materials from the sides of the car takes place between the two axes 6 on which the car platform is adapted to tilt, first in one direction and then in the other, and in order to insure the discharge of all the materials into the hopper 73 previously mentioned, the tilting platform is preferably provided at each side thereof with a guard or baffle wall 92, as shown in Figs. 1, 2, 12 and 14, these walls extending high enough at each side to keep the grain from spreading laterally. In addition, these baffle walls are each provided with a pair of swinging gates or baffles 93, hinged to the vertical edges thereof. These gates can swing inward or toward each other, but not outward, and they are normally held in closed position, so to speak, by the weights 94 on the ropes or flexible connections 95 which extend around sheaves 96 and 97 and which have their ends connected to the doors at 98 whereby the doors stand normally at right angles to the walls 92, as shown. The workman in charge of loading the cars can swing the doors inwardly, toward each other, in order to pass into the spaces between the car and the walls 92, as doors swing easily on their hinges and against the pull of the weights 96, when they are pushed inwardly and toward each other, and they then come back automatically in the positions shown in the drawings. In this way the grain discharged from the car is all directed through the platform and into the hopper 73 previously mentioned. The tilting plaform is of any suitable form, or any suitable construction, but the middle portion of the platform is preferably provided with transverse beams 99 forming lateral extensions at opposite sides of the platform, and upon these extensions the battering rams are supported as shown.

Any suitable fluid pressure can be supplied, but the hydraulic system is preferably operated with oil as the means for transmitting fluid pressure through the different pipes to the different cylinders. It is contemplated, it will be understood, that all of the valves indicated in Fig. 27 will, in actual practice, be grouped together at a point one side of the pit, and in such position that one man will be able to operate the entire dumper by moving or operating only a comparatively few handles, without changing his position, and always in clear view of the dumping or discharging materials. For example, a typical operation of the apparatus may involve first, the locking of the car in central position on the bridge or tilting platform, so that the car doors will be directly in line with the battering rams, and the time required for this will be approximately twelve and a half seconds. Second, the battering rams will be operated to push in the doors, and then the removal of the boards forming the doors will be accomplished by manual labor. By this operation approximately one third of the load will leave the horizontal car, and the time required for this will be approximately twelve seconds, plus the time required by the attendants to remove the lumber of the car doors. Third, the bridge or car platform will be tilted to the right, so that approximately another third of the materials will leave the car, and the time required for this will be approximately forty-five seconds. Fourth, the bridge or platform with the car thereon will be lowered to horizontal position, and during this operation the rams will be withdrawn and turned over and reinserted, so that they will be ready to deflect the grain or other materials when the car is then tilted in the opposite direction. For the withdrawal and reinsertion of the rams approximately twenty-four seconds will be required, and the time required to lower the bridge will be approximately forty-five seconds. Fifth, the bridge with the car thereon will be tilted to the left, thereby causing the final one third of the materials to be discharged against the deflectors, so that the remaining portion of the load will leave the car. The time required for this operation will be approximately forty-five seconds. Sixth, the now empty car will be removed, and approximately twelve and a half seconds will be required for this purpose. It will be seen, therefore, that the car dumper proper is essentially a structural steel plate girder bridge made long enough to accommodate the longest box car employed on railroads.

The car opening means comprising battering rams, are mounted on the lateral extensions of the bridge, forming outrigger platforms for the rams. When at rest, the bridge or tilting platform is supported by the bearings 7 previously mentioned, mounted on pedestals provided in the pit, and when at rest the bridge is automatically locked to the abutments or to the wall of the pit by a secondary function, so to speak, of the car locking devices, inasmuch as the primary function of the beams or structural members 17 is to form a sliding carriage to support the guides 22 in which the side members of the clamps 12 slide up and down, but these members 17 have, as explained, the secondary function of serving as locking members to lock the bridge or platform 1 in horizontal position. Therefore, the guides 22 are a unit with the horizontal sliding carriage formed by the crosshead 15 and the longitudinal beams 17, the said carriage sliding in ways formed on the side portions of the bridge or tilting platform. As the beams 17 approach the locking position thereof, the lower ends of the clamps 12 pass beyond the offsets 34 and are then free to drop down into the position indicated in dotted lines in Fig. 5 of the drawings. When the piston rods 14 move toward each other, the chains 20 first exert a vertical pull on the clamping members 12, and when the latter are raised sufficiently these chains then exert a horizontal pull on the entire carriage structure, so that the clamps 12 slide toward each other into operative positions at the ends of the car, in the manner shown and described. The power necessary to move the clamps 12 toward each other can be communicated from the crosshead 19 to the crosshead 15, or the length of the chains 20 can be such these chains will exert a direct horizontal pull, after raising the clamps, sufficient to pull the two carriages toward each other, even though the relative arrangement may not permit the crosshead 19 to engage the crosshead 15, for all that is necessary is a longitudinal pull on both carriages, just after the two clamps 12 have been raised high enough to slide over the plates 32 toward each other.

Furthermore, it will be seen that one advantage of the tilted position of the battering rams 37, as they move toward each other, as shown in Figs. 3 and 12, is that the lower portion of the face of each ram will strike first, thereby first engaging the lowermost boards of the doors, and causing the bottom boards to be pushed inwardly first, and then those above, one after another, in a manner to remove the boards gradually from the bottom toward the top of each doorway. Then, after the removed or detached boards are disposed of by manual labor, and are taken out of the way, the battering rams 37 will resume their travel toward each other and will assume horizontal positions as soon as the trolleys 48 leave the raised portions 65 of the tracks upon which they travel, and the two rams thus brought together will assume a horizontal position close to or upon the floor of the car, in the manner explained.

Again, as shown in Figs. 2, 3, 10 and 11, it will be seen that the hydraulic lifts are of that type in which the outer cylinder is made the moving part, and at its upper end is provided with a double knuckle joint connection to the trunnion 6 on the bottom of the bridge, to allow for the swinging movement when the bridge is tilting, as well as to allow for some misalignment. Substantially the same provision is made at the lower end of each hydraulic lift 8, so that no binding action will be liable to take place at any time during the operation of these hydraulic lifts. It will be seen that the fluid pressure is supplied to the lower ends of the lifts 8, as indicated by the arrow in Fig. 10, by any suitable connection to the pressure mains or pipes, and the pressure is controlled by valves, in the manner shown and described, to permit the pressure to enter and leave the cylinders, thereby to tilt the bridge and the car thereon in the manner shown and described. Of course, the hydraulic apparatus can be controlled by valves of any suitable or desired construction, arranged in any suitable or desired manner, for the invention is not limited to the particular construction shown and described.

What I claim as my invention is:

1. The method of dumping the load of materials from a car having side doors, comprising the pushing in of the doors at the opposite sides of the car, thereby releasing and discharging the middle portion of the load from the sides of the car, then tilting the car endwise about one axis to discharge one end portion of the load from the side, and thereafter tilting the car endwise in the opposite direction about another axis to laterally discharge the other end portion of the load, whereby the entire load is discharged in three separate stages or operations.

2. A method as specified in claim 1, the second operation, and also the third, consisting in raising one end of the car and discharging the portion of the load carried in the upper end of the tilted car.

3. A method as specified in claim 1, the second operation, and also the third, comprising the tilting upward of one end of the car about a transverse axis located under the other end portion of the car.

4. A method as specified in claim 1, the second operation, and also the third, comprising the tilting upward of one end of the car in a manner to also raise the middle portion of the car.

5. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the side of the car comprising a power operated ram, and said deflecting means being carried on one side of said ram, together with means for turning said ram over to bring said deflecting means into position to effect the discharge of the final portion of the load.

6. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising a hydraulic lift upon which one end portion of the platform is pivoted, another hydraulic lift upon which the other end portion of the platform is pivoted, and a pivotal mounting for the lower end of each hydraulic lift.

7. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the side of the car comprising a power operated battering ram having one side thereof beveled to form said deflecting means, said ram being movable into the car with said beveled side thereof facing toward one end of the car, and automatic means for withdrawing the ram and turning it over and then moving it into the car again with its beveled side facing toward the other end of the car.

8. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the car comprising a battering ram for each side of the car, means for moving said rams toward each other to open the opposite sides of the car, thereby to permit the middle portion of the load to be discharged at opposite sides of the car, and means for causing withdrawal of the rams from the sides of the car, said deflecting means comprising a beveled side for each ram, in combination with means to reverse each ram in order that its beveled side may face toward either end of the car.

9. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the car comprising devices disposed in position to open the opposite sides of the car, whereby one half the load is discharged in three separate stages at one side of the car, while the other half of the load is discharged at the same time in three separate stages at the opposite side of the car.

10. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising a power operated lift for one end portion of the platform, a power operated lift for the other end portion of the platform, so that either end portion of the platform may be raised about an axis disposed below the other end portion of the platform, stationary means to afford a stable condition of the axis under one end portion of the platform, when the other end portion of the platform is raised, and a similar stationary means for the other axis of tilting motion.

11. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising means to provide a tilting axis under each end portion of the platform, with space between said axes for the discharge of the load from the car, and stationary means to insure a stable condition of each axis while the other axis is moving upward to tilt the car.

12. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising a transverse trunnion under each end portion of the platform, with a space between said trunnions for the discharge from the car, means for lifting one trunnion to tilt the platform of the other trunnion, means for lifting the other trunnion to tilt the car in the other direction, and stationary trunnion bearings for each trunnion, whereby either trunnion is supported while the other trunnion is being raised to tilt the car.

13. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the car comprising a movable cylinder, a battering ram on the end of said cylinder, a hollow member upon which said cylinder is mounted, means for introducing fluid pressure within the cylinder to cause the movement thereof in a direction to actuate said ram against the entrance to the car, a piston rigid with said cylinder and slidable within said hollow member, and means for introducing fluid pressure within said hollow member to cause the reverse motion of said ram.

14. Apparatus for dumping cars, comprising a platform to support the car, means supported by said platform and operative for opening the side of the car, instrumentalities for tilting said platform first in one direction and then in the other, thereby to first raise one end of the car and then the other, deflecting means on said opening means for effecting the lateral discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, in combination with locking means for said platform, fluid pressure operated means on said platform to control said locking means, and means operated by said fluid pressure means to hold the car in position during the tilting thereof.

15. Apparatus for opening cars, and for discharging the load therefrom, comprising a power operated battering ram to effect an entrance at the side of the car, adapted to be inserted through the entrance into the car to facilitate the discharge of the load, in combination with a similar battering ram for the other side of the car, whereby the car is opened at opposite sides thereof, and means to receive the discharge from the opposite sides of the car.

16. Apparatus for opening cars, and for discharging the load therefrom, comprising a power operated battering ram to effect an entrance at the side of the car, adapted to be inserted through the entrance into the car to facilitate the discharge of the load, in combination with a deflecting means carried by said battering ram, means for turning said ram over to present said deflecting means in the opposite direction, means for causing one end portion of the load to gravitate against said deflecting means before the ram is reversed, and means for causing the other end portion of the load to gravitate against said deflecting means after the ram is turned over, whereby the middle portion of the load is discharged first, then one end portion thereof, and finally the other end portion of the load.

17. Apparatus for discharging the load from a car, comprising means including a pivotal joint for raising and tilting the car in one direction, thereby to discharge a portion of the load, and means including a pivotal joint for raising and tilting the car in the opposite direction to discharge another portion of the load, each pivot being stationary while the other is rising to tilt the car.

18. A structure as specified in claim 17, said tilting means forming a transverse axis below each end portion of the car, with space between said axes for the discharge from the car, and means whereby either axis is held stationary while the other axis is being raised to tilt the car.

19. A structure as specified in claim 17, said tilting means comprising a tilting platform, in combination with means whereby the tilting of the platform in either direction will effect a discharge of a portion of the load at the middle of the car.

20. A structure as specified in claim 17, in combination with means whereby the tilting of the car in either direction will effect a discharge of a portion of the load at opposite sides of the car, at the middle thereof, and means for receiving the discharge from the car.

21. A structure as specified in claim 17, in combination with means whereby the tilting of the car in either direction will effect the discharge of a portion of the load, and means for receiving the discharge from the car.

22. In apparatus for unloading cars, the combination of a tilting platform, devices mounted on said platform and adapted to tilt therewith, serving to open the side of the car, adapted to then enter the car to facilitate the discharge therefrom, and instrumentalities for thereafter tilting the car in a manner to facilitate the discharge of the load therefrom, said means for opening the side of the car comprising a fluid pressure operated battering ram provided with an angularly disposed side to serve as a deflector to facilitate the discharge when the car is tilted.

23. In apparatus for unloading cars, the combination of a tilting platform, devices mounted on said platform and adapted to tilt therewith, serving to open the side of the car, adapted to then enter the car to facilitate the discharge therefrom, and instrumentalities for thereafter tilting the car in a manner to facilitate the discharge of the load therefrom, in combination with a baffle at the side of the car, mounted on said platform, and swinging gates extending toward the car from the opposite edges of said baffle, said gates being movable toward each other to permit access to the space between them, and means for automatically returning the gates to normal position.

24. In car dumping apparatus, the combination of a movable support for the car, instrumentalities having means for locking the car in position on said movable support, and auxiliary devices whereby the operation of said instrumentalities has the additional function of automatically locking and unlocking said movable support, whereby the support is locked in horizontal position while the car is entering and leaving the apparatus, said movable support comprising a bridge mounted to tilt about a plurality of transverse axes, with said axes disposed a distance apart to provide space between them for the discharge of the load from said car.

25. In car dumping apparatus, the combination of a movable support for the car, instrumentalities having means for locking the car in position on said movable support, and auxiliary devices whereby the operation of said instrumentalities has the additional function of automatically locking and unlocking said movable support, whereby the support is locked in horizontal position while the car is entering and leaving the apparatus, said instrumentalities comprising hydraulic cylinders having pistons therein, and including horizontal sliding carriages actuated by said pistons, said carriages being movable toward each other to cause the locking means to engage the car.

26. In car dumping apparatus, the combination of a movable support for the car, instrumentalities having means for locking the car in position on said movable support, and auxiliary devices whereby the operation of said instrumentalities has the additional function of automatically locking and unlocking said movable support, whereby the support is locked in horizontal position while the car is entering and leaving the apparatus, said instrumentalities comprising horizontal sliding carriages on the movable support, vertically movable clamping members slidably mounted on said carriages, power operated crossheads, sheaves on said carriages, flexible connections extending from said crossheads over said sheaves and downward to the lower ends of said vertically movable clamping members, and braces for the upper ends of said clamping members, said braces having sliding connection with said carriages at their lower ends, and means to automatically hold said carriages against sliding movement toward each other until said clamping members are fully elevated into position to engage the ends of the car.

27. In car dumping apparatus, the combination of a movable support, means for locking a car in position thereon, and instrumentalities co-operating to discharge the contents of the car, thereby to discharge the middle portion of the load first, while the car is horizontal, then one end portion by motion of the car about one axis, and then the other end portion of the load by motion of the car about another axis.

28. A structure as specified in claim 27, said instrumentalities comprising means for tilting the car endwise, first in one direction and then in the other, including deflecting means co-operating with such tilting motion to laterally and successively discharge the end portions of the load.

29. A structure as specified in claim 27, said instrumentalities comprising means for tilting the car first in one direction and then in the opposite direction, including deflecting means to co-operate with this tilting motion to successively discharge the end portions of the load.

30. A structure as specified in claim 27, including fluid pressure devices for operating said movable support, and for operating said locking means, as well as for effecting an entrance into the sides of the car, and devices comprising pipe connections and valves and a pump and motor for controlling said pressure operated devices.

31. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the side of the car comprising a power operated ram, and said deflecting means being carried on one side of said ram, together with means for turning said ram over to bring said deflecting means into position to effect the discharge of the final portion of the load.

32. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the side of the car comprising a power operated battering ram having one side thereof beveled to form said deflecting means, said ram being movable into the car with said beveled side thereof facing toward one end of the car, and automatic means for withdrawing the ram and turning it over and then moving it into the car again with its beveled side facing toward the other end of the car.

33. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the car comprising a battering ram for each side of the car, means for moving said rams toward each other to open the opposite sides of the car, thereby to permit the middle portion of the load to be discharged at opposite sides of the car, and means for causing withdrawal of the rams from the sides of the car, said deflecting means comprising a beveled side for each ram, in combination with means to reverse each ram in order that its beveled side may face toward either end of the car.

34. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the car comprising devices disposed in position to open the opposite sides of the car, whereby one-half the load is discharged in three separate stages at one side of the car, while the other half of the load is discharged at the same time in three separate stages at the opposite side of the car.

35. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising a power operated lift for one end portion of the platform, a power operated lift for the other end portion of the platform, so that either end portion of the platform may be raised about an axis disposed below the other end portion of the platform, stationary means to afford a stable condition of the axis under one end portion of the platform, when the other end portion of the platform is raised, and a similar stationary means for the other axis of tilting motion.

36. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising means to provide a tilting axis under each end portion of the platform, with space between said axes for the discharge of the load from the car, and stationary means to insure a stable condition of each axis while the other axis is moving upward to tilt the car.

37. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said instrumentalities comprising a transverse trunnion under each end portion of the platform, with a space between said trunnions for the discharge from the car, means for lifting one trunnion to tilt the platform of the other trunnion, means for lifting the other trunnion to tilt the car in the other direction, and stationary trunnion bearings for each trunnion, whereby either trunnion is supported while the other trunnion is being raised to tilt the car.

38. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, said means for opening the car comprising a movable cylinder, a battering ram on the end of said cylinder, a hollow member upon which said cylinder is mounted, means for introducing fluid pressure within the cylinder to cause the movement thereof in a direction to actuate said ram against the entrance to the car, a piston rigid with said cylinder and slidable within said hollow member, and means for introducing fluid pressure within said hollow member to cause the reverse motion of said ram.

39. Apparatus for dumping cars, comprising a platform to support the car, means for opening the side of the car, instrumentalities for tilting said platform first in one direction and then in the other, thereby to first raise one end of the car and then the other, deflecting means for effecting the discharge of the load, first from one end of the car and then from the other, at the middle of the car, by said tilting motion, whereby a portion of the load is discharged by said opening of the car, while another portion of the load is discharged by the tilting of the car in one direction, and the final portion is discharged by the tilting of the car in the opposite direction, in combination with locking means for said platform, fluid pressure operated means on said platform to control said locking means, and means operated by said fluid pressure means to hold the car in position during the tilting thereof.

40. Apparatus for opening cars, and for discharging the load therefrom, comprising a power operated battering ram to effect an entrance at the side of the car, in combination with a deflecting means carried by said battering ram, means for turning said ram over to present said deflecting means in the opposite direction, means for causing one end portion of the load to gravitate against said deflecting means before the ram is reversed, and means for causing the other end portion of the load to gravitate against said deflecting means after the ram is turned over, whereby the middle portion of the load is discharged first, then one end portion thereof, and finally the other end portion of the load.

41. Apparatus for discharging the load from a car, comprising means for tilting the car in one direction, thereby to discharge a portion of the load, and means for tilting the car in the opposite direction to discharge another portion of the load, said tilting means forming a transverse axis below each end portion of the car, with space between said axes for the discharge from the car, and means whereby either axis is held stationary while the other axis is being raised to tilt the car.

42. In apparatus for unloading the cars, the combination of a tilting platform, devices mounted on said platform and adapted to tilt therewith, serving to open the side of the car, and instrumentalities for thereafter tilting the car in a manner to facilitate the discharge of the load therefrom, said means for opening the side of the car comprising a fluid pressure operated battering ram provided with an angularly disposed side to serve as a deflector to facilitate the discharge when the car is tilted.

43. In apparatus for unloading the cars, the combination of a tilting platform, devices mounted on said platform and adapted to tilt therewith, serving to open the side of the car, and instrumentalities for thereafter tilting the car in a manner to facilitate the discharge of the load therefrom, in combination with a baffle at the side of the car, mounted on said platform, and swinging gates extending toward the car from the opposite edges of said baffle, said gates being movable toward each other to permit access to the space between them, and means for automatically returning the gates to normal position.

44. In car dumping apparatus, the combination of a movable support for the car, instrumentalities having means for locking the car in position on said movable support, and auxiliary devices whereby said instrumentalities have the secondary function of automatically locking and unlocking said movable support, whereby the support is locked in horizontal position while the car is entering and leaving the apparatus, said movable support comprising a bridge mounted to tilt about a plurality of transverse axes, with said axes disposed a distance apart to provide space between them for the discharge of the load from said car.

45. In car dumping apparatus, the combination of a movable support for the car, instrumentalities having means for locking the car in position on said movable support, and auxiliary devices whereby said instrumentalities have the secondary function of automatically locking and unlocking said movable support, whereby the support is locked in horizontal position while the car is entering and leaving the apparatus, said instrumentalities comprising hydraulic cylinders having pistons therein, and including horizontal sliding carriages actuated by said pistons, and carriages being movable toward each other to cause the locking means to engage the car.

46. In car dumping apparatus, the combination of a movable support for the car, instrumentalities having means for locking the car in position on said movable support, and auxiliary devices whereby said instrumentalities have the secondary function of automatically locking and unlocking said movable support, whereby the support is locked in horizontal position while the car is entering and leaving the apparatus, said instrumentalities comprising horizontal sliding carriages on the movable support, vertically movable clamping members slidably mounted on said carriages, power operated crossheads, sheaves on said carriages, flexible connections extending from said crossheads over said sheaves and downward to the lower ends of said vertically movable clamping members, and braces for the upper ends of said clamping members, said braces having sliding connection with said carriages at their lower ends, and means to automatically hold said carriages against sliding movement toward each other until said clamping members are fully elevated into position to engage the ends of the car.

47. In car dumping apparatus, the combination of a movable support, means for locking a car in position thereon, and instrumentalities cooperating to discharge the contents of the car, thereby to discharge the middle portion of the load first, then one end portion, and then the other end portion of the load, including fluid pressure devices for operating said movable support, and for operating said locking means, as well as for effecting an entrance into the sides of the car, and devices comprising pipe connections and valves and a pump and motor for controlling said pressure operated devices.

AUGUSTUS T. PERKINS.